United States Patent
Wakasa et al.

(10) Patent No.: US 11,374,620 B2
(45) Date of Patent: *Jun. 28, 2022

(54) APPLICATION PROVIDING SYSTEM, PORTABLE TERMINAL DEVICES, SERVER DEVICE, APPLICATION PROVIDING METHOD AND COMPUTER PROGRAMS

(71) Applicant: FeliCa Networks, Inc., Tokyo (JP)

(72) Inventors: Shigeki Wakasa, Kanagawa (JP); Jun Ogishima, Tokyo (JP); Takahiro Shimizu, Saitama (JP)

(73) Assignee: FeliCa Networks, Inc., Tokyo (JP)

( * ) Notice: Subject to any disclaimer, the term of this patent is extended or adjusted under 35 U.S.C. 154(b) by 171 days.

This patent is subject to a terminal disclaimer.

(21) Appl. No.: 16/656,218

(22) Filed: Oct. 17, 2019

(65) Prior Publication Data

US 2020/0059267 A1 Feb. 20, 2020

Related U.S. Application Data

(63) Continuation of application No. 16/215,051, filed on Dec. 10, 2018, now Pat. No. 10,484,051, which is a
(Continued)

(30) Foreign Application Priority Data

Aug. 31, 2005 (JP) ................................. 2005-251996

(51) Int. Cl.
*H04B 5/00* (2006.01)
*H04L 67/04* (2022.01)
(Continued)

(52) U.S. Cl.
CPC ........... *H04B 5/0031* (2013.01); *H04L 67/04* (2013.01); *H04L 67/12* (2013.01); *H04L 67/18* (2013.01);
(Continued)

(58) Field of Classification Search
CPC ........ H04B 5/0031; H04W 4/60; H04L 67/04; H04L 67/12; H04L 67/18; H04L 67/34; H04M 1/7253
See application file for complete search history.

(56) References Cited

U.S. PATENT DOCUMENTS 5,960,204 A * 9/1999 Yinger ...................... G06F 8/61
709/221
6,151,708 A * 11/2000 Pedrizetti .................. G06F 8/65
717/173
(Continued)

FOREIGN PATENT DOCUMENTS

CN 1465006 12/2003
EP 1128264 8/2001
(Continued)

OTHER PUBLICATIONS

Japanese Patent Office, Notification of reasons for refusal issued in connection with Japanese Patent Application No. 2011-020136, dated Sep. 25, 2012. (4 pages).
(Continued)

*Primary Examiner* — Ernest G Tacsik
(74) *Attorney, Agent, or Firm* — K&L Gates LLP

(57) ABSTRACT

An application providing system is provided. The application providing system includes a portable terminal device having an IC chip configured to perform radio communications; and a server device; the application providing system connecting the portable terminal device and the server device through a communication network, wherein the portable terminal device includes a transmitted message receiver section, an application determination section, an application transmission request generation section, and an application storage section, wherein the server device includes a transmitted message generation section, a transmitted message sender section, an application transmission
(Continued)

request receiver section, an application storage section, and an application sender section.

19 Claims, 9 Drawing Sheets

Related U.S. Application Data continuation of application No. 14/508,106, filed on Oct. 7, 2014, now Pat. No. 10,181,876, which is a continuation of application No. 13/006,020, filed on Jan. 13, 2011, now Pat. No. 8,862,110, which is a continuation of application No. 11/467,806, filed on Aug. 28, 2006, now Pat. No. 7,881,709.

(51) Int. Cl.
*H04L 67/12* (2022.01)
*H04L 67/52* (2022.01)
*H04W 4/60* (2018.01)
*H04M 1/72412* (2021.01)
*H04L 67/00* (2022.01)

(52) U.S. Cl.
CPC ........ *H04L 67/34* (2013.01); *H04M 1/72412* (2021.01); *H04W 4/60* (2018.02)

(56) References Cited

U.S. PATENT DOCUMENTS

| | | | |
|---|---|---|---|
| 6,523,166 | B1 | 2/2003 | Mishra et al. |
| 7,886,970 | B2 | 2/2011 | Kurita |
| 2002/0080935 | A1 | 6/2002 | Kawagishi |
| 2002/0155892 | A1 | 10/2002 | Mishina et al. |
| 2002/0183045 | A1 | 12/2002 | Emmerson et al. |
| 2002/0194325 | A1 | 12/2002 | Chmaytelli et al. |
| 2002/0194349 | A1 | 12/2002 | Tanaka |
| 2004/0043763 | A1 | 3/2004 | Minear et al. |
| 2004/0068724 | A1* | 4/2004 | Gardner, III ............. G06F 8/65 717/173 |
| 2004/0152457 | A1 | 8/2004 | Goldstein et al. |
| 2004/0209651 | A1 | 10/2004 | Tsukamoto |
| 2005/0009564 | A1 | 1/2005 | Hayaashi et al. |
| 2005/0108317 | A1 | 5/2005 | Someya et al. |
| 2005/0114389 | A1 | 5/2005 | Kamiya |
| 2005/0144142 | A1* | 6/2005 | Takayama ............. G06Q 30/06 705/64 |
| 2005/0177419 | A1 | 8/2005 | Choi et al. |
| 2005/0188219 | A1 | 8/2005 | Annie et al. |
| 2006/0129628 | A1 | 6/2006 | Kamiya et al. |
| 2006/0179079 | A1 | 8/2006 | Kolehmainen |
| 2008/0254780 | A1 | 10/2008 | Kuhl et al. |
| 2011/0105086 | A1 | 5/2011 | Kurita |

FOREIGN PATENT DOCUMENTS

| | | |
|---|---|---|
| EP | 1391810 | 4/2004 |
| JP | 10-187898 | 7/1998 |
| JP | 2002-032293 | 1/2002 |
| JP | 2003-099738 | 4/2003 |
| JP | 2003-141018 | 5/2003 |
| JP | 2003-219465 | 7/2003 |
| JP | 2004-110320 | 4/2004 |
| JP | 2004-178522 | 6/2004 |
| JP | 2004-182561 | 7/2004 |
| JP | 2004-221721 | 8/2004 |
| JP | 2004-355507 | 12/2004 |
| JP | 2005-038209 | 2/2005 |
| JP | 2005-108044 | 4/2005 |
| WO | 2005-066802 | 7/2005 |
| WO | 2007-001030 | 1/2007 |

OTHER PUBLICATIONS

Japanese Office Action dated Jul. 17, 2012 for corresponding Japanese Appln. No. 2011-020136.

Japanese Office Action dated Mar. 2, 2010, for corresponding Japanese Patent Appln. No. 2005-251996.

* cited by examiner

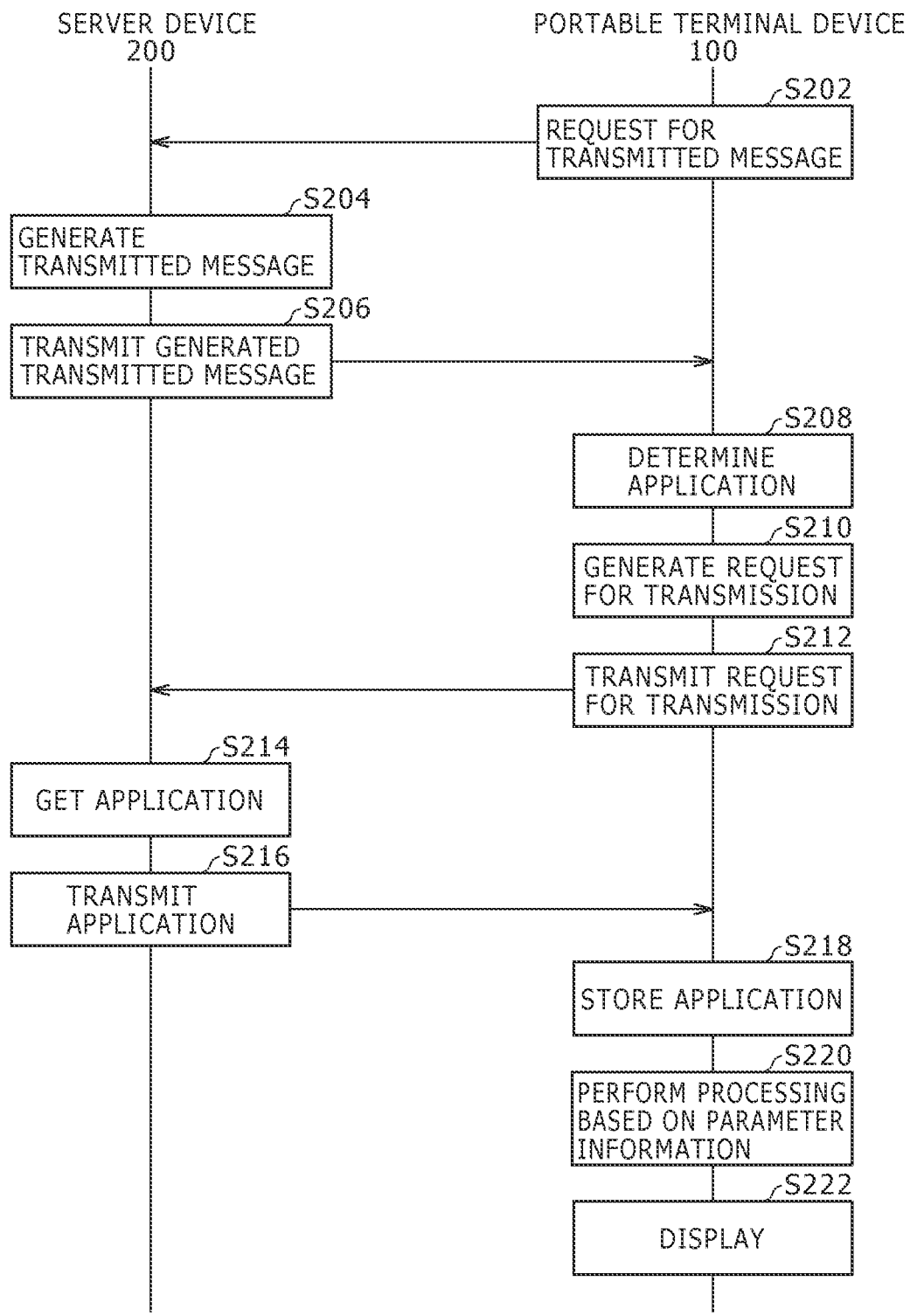

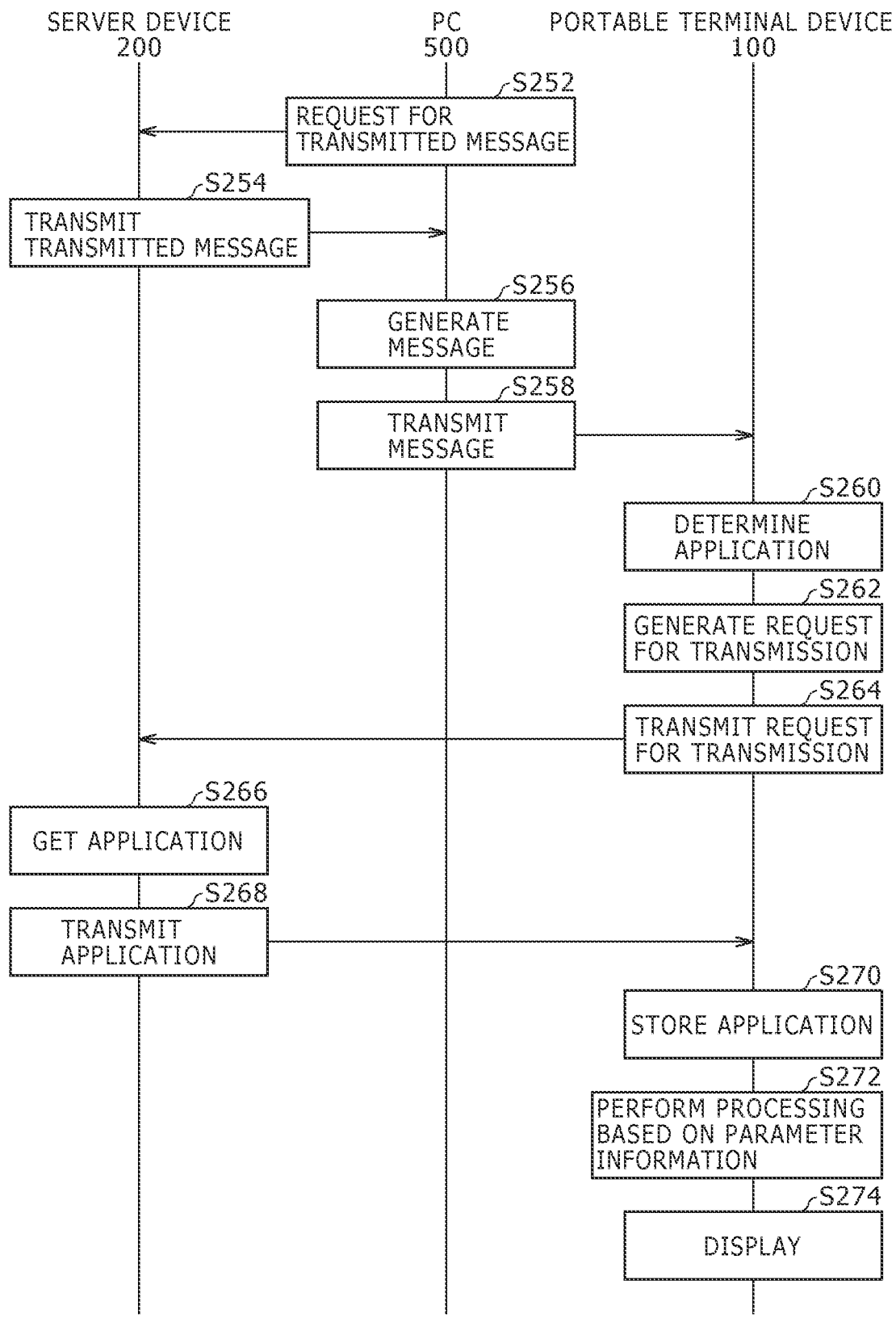

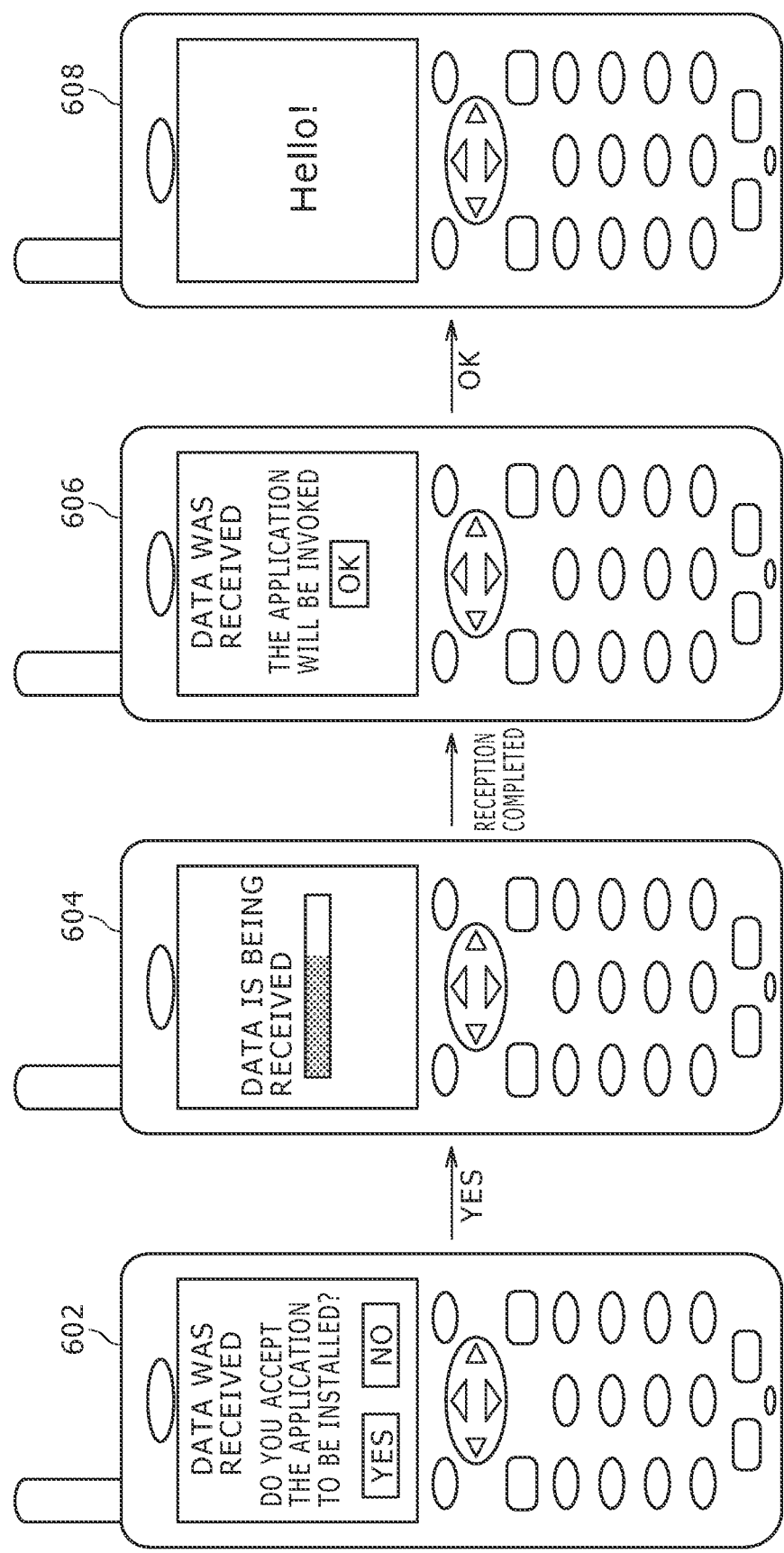

APPLICATION PROVIDING SYSTEM, PORTABLE TERMINAL DEVICES, SERVER DEVICE, APPLICATION PROVIDING METHOD AND COMPUTER PROGRAMS

CROSS REFERENCES TO RELATED APPLICATION

The present application is a continuation that claims priority to U.S. patent application Ser. No. 16/215,051, filed Dec. 10, 2018, which is a continuation of U.S. patent application Ser. No. 14/508,106, filed on Oct. 7, 2014, which is a continuation of U.S. patent application Ser. No. 13/006,020 filed on Jan. 13, 2011, which is a continuation of U.S. patent application Ser. No. 11/467,806 filed on Aug. 28, 2006, which claims priority to Japanese Patent Application JP 2005-251996 filed in the Japanese Patent Office on Aug. 31, 2005, the entire contents of which being incorporated herein by reference.

BACKGROUND

The present disclosure relates to an application providing system, a portable terminal device, a server device and an application providing method. More particularly, the present disclosure relates to an application providing system in which, if an application corresponding to identification information transmitted from a server device does not exist in a portable terminal device, the server device automatically downloads the identified application to the portable terminal device.

In recent years, a portable terminal device such as a portable phone includes an IC chip capable of carrying out radio communications. Thus, by carrying out a non-contact communication between an external device and the IC chip employed in the portable terminal device, data can be exchanged between the external device and the portable terminal device. Normally, in the course of a communication with an external device, the IC chip employed in the portable terminal device is not capable of communicating with a controller which controls the execution of applications of the portable terminal device. In the course of a communication with the controller, on the other hand, the IC chip is not capable of communicating with an external device.

In order to solve the problem described above, there has been developed a technology whereby the external device transmits information specifying an application to be executed in the portable terminal device and a special command to the portable terminal device and, in accordance with the command, the portable terminal device smoothly activates the application specified by the external terminal for execution in the portable terminal device as disclosed, for example, in Japanese Patent Laid-open No. 2005-108044. When the IC chip employed in the portable terminal device receives the special command, the IC chip transits to a communication state enabling communications with the controller. Then, with the timing of this transition, the controller acquires information received from the external device as the information specifying an application and executes the specified application.

If the application specified by the external device does not exist in the portable terminal device, however, the user may not obtain desired information unless the specified application is downloaded from a web site of a service company to the portable terminal device and executed in the portable terminal device. Thus, in order for the user to obtain the desired information, the user should transmit an e-mail for making a request of the application to the service company or get the URL (Uniform Resource Locator) of the web site of the service company.

Since such an operation making a request for an application is cumbersome, in some cases, the user prefers not to acquire the application and gives up the idea to obtain the desired information. In addition, the user may not be able to acquire the application and receive the desired information because the URL is not inputted correctly. Thus, there is a problem that, if the specified application does not exist in the portable terminal device as described above, the user may not obtain the desired information even if the user can acquire data related to desired information and the service company inevitably loses an opportunity to provide the desired information itself to the user.

SUMMARY

According to an embodiment, there is provided an application providing system, portable terminal devices, server devices, application providing method and computer programs capable of determining whether or not a specified application exists in a portable terminal device of the application providing system so as to allow the user to smoothly acquire desired information.

According to an embodiment, there is provided an application providing system connecting a portable terminal device having an IC chip capable of carrying out radio communications to a server device by using a communication network. The application providing system is characterized in that the portable terminal device has: a transmitted message receiver section provided inside the IC chip as a section for receiving a transmitted message including parameter information and the identification information of an application to be executed by the portable terminal device on the basis of the parameter information from the server device; and an application determination section determining as to whether or not the application corresponding to the identification information of the application included in the transmitted message exists in the portable terminal device. The portable terminal device also has: an application transmission request generation section for generating a request for transmission of the identified application from the server device to the portable terminal device in case the application determination section determines that the application corresponding to the identification information included in the transmitted message does not exist in the portable terminal device; and an application storage section for storing an application transmitted by the server device. The application providing system is also characterized in that the server device has: a transmitted message generation section for generating a transmitted message to be transmitted to the portable terminal device; and a transmitted message sender section for transmitting the transmitted message to the portable terminal device in accordance with a request made by the portable terminal device. The server device also has: an application transmission request receiver section for accepting a request transmitted by the portable terminal device as a request for transmission of an application from the server device to the portable terminal device in case the application to be executed in the portable terminal device on the basis of parameter information does not exist in the portable terminal device; an application storage section used for storing applications and application identity information by associating the applications with their respective application identity information each used for identifying the associated one of the applications; and an application sender section for transmitting an application according to a request accepted by the application transmission request receiver section from the portable terminal device to the portable terminal device.

The parameter information is information used for requesting the application of the portable terminal device to display information desired by the user or carry out predetermined processing. The identification information of the application is information used for identifying the application. For example, the identification information is stored in the portable terminal device as information identifiable by a predetermined ID, a URL or the like.

In accordance with the configuration of the application providing system described above, the portable terminal device receiving a transmitted message generated and transmitted by the server device determines as to whether or not an application corresponding to identification information included in the transmitted message exists in the portable terminal device. If the application corresponding to the identification information included in the transmitted message does not exist in the portable terminal device, the portable terminal device issues a request for transmission of the application to the server device. Thus, even if the application corresponding to the identification information included in the transmitted message does not exist in the portable terminal device, a sequence of processes starting with reception of a transmitted message and ending with acquisition of the application can be carried out in a smooth flow without the need for the user to perform cumbersome operations including an inputting a URL or the like. In addition, since the portable terminal device is capable of issuing the request for transmission of the application corresponding to the identification information included in the transmitted message to the server device without the need for the user to perform any operations, it is no longer necessary for the user to know the location, at which the application exists, in advance. In addition, since the user is capable of acquiring an application not existing in the portable terminal device from the server device by merely carrying out a simple operation, the service company providing the user with information is capable of providing information to the user with a higher degree of reliability.

According to an another embodiment, there is provided a portable terminal device connected to a server device by using a communication network and provided with an IC chip capable of carrying out radio communications. The portable terminal device including: a transmitted message receiver section provided inside the IC chip as a section for receiving a transmitted message including parameter information and the identification information of an application to be executed by the portable terminal device on the basis of the parameter information from the server device; and an application determination section for producing a result of determination as to whether or not the application corresponding to the identification information included in the transmitted message exists in the portable terminal device. The portable terminal device also including: an application transmission request generation section for generating a request for transmission of the identified application from the server device to the portable terminal device in case the application determination section determines that the application corresponding to the identification information included in the transmitted message does not exist in the portable terminal device; and an application storage section for storing an application transmitted by the server device.

According to another embodiment, there is provided the portable terminal device with a configuration also including a display section for displaying a result of execution of an application executed on the basis of parameter information included in a transmitted message.

Accordance to the above configuration of the portable terminal device, the portable terminal device receiving a transmitted message generated and transmitted by the server device determines as to whether or not an application corresponding to identification information included in the transmitted message exists in the portable terminal device. If the application corresponding to the identification information included in the transmitted message does not exist in the portable terminal device, the portable terminal device generates a request for transmission of the application from the server device to the portable terminal device, and transmits the request to the server device. Thus, even if the application corresponding to the identification information included in the transmitted message does not exist in the portable terminal device, the application corresponding to the identification information is automatically installed in the portable terminal device from the server device, making it possible to provide information to the user smoothly.

According to another embodiment, there is provided the portable terminal device also including a controller for controlling execution of predetermined applications. In this case, the controller controls the execution of the application, which is corresponding to the identification information of the application, on the basis of the parameter information included in the transmitted message.

According to another embodiment, there is provided the portable terminal device with a configuration in which the IC chip has: a first communication section for carrying out a near-field non-contact communication with an external communication device also connected to the server device by using the communication network; and a second communication section for carrying out a communication with the controller.

In this case, a transmitted message received by the first communication section from the external communication device is sent to the controller via the second communication section. In this configuration, the IC chip switches from a communication between the first communication section and the external device to a communication between the second communication section and the controller and vice versa so as to allow an application to be executed smoothly.

According to another embodiment, there is provided the portable terminal device with a configuration in which the transmitted message includes pieces of identification information used for identifying a plurality of applications according to the specifications of the portable terminal device. In this case, the application determination section determines as to whether or not each of the applications each corresponding to one of the pieces of identification information included in the transmitted message exists in the portable terminal device.

According to another embodiment, there is provided there is provided a server device connected by a communication network to a portable terminal device having an IC chip capable of carrying out radio communications. The server device including: a transmitted message generation section for generating a transmitted message to be transmitted to the portable terminal device as a transmitted message including parameter information and the identification information of an application to be executed by the portable terminal device on the basis of the parameter information; and a transmitted message sender section for transmitting the transmitted message to the portable terminal device in accordance with a request made by the portable terminal device. The server device further including: an application transmission request receiver section for accepting a request transmitted by the portable terminal device as a request for transmission of an application from the server device to the portable terminal device in case the application to be executed in the portable terminal device on the basis of parameter information does not exist in the portable terminal device; an application storage section used for storing applications and application identification information by associating the applications with their respective application identification information each used for identifying the associated one of the applications; and an application sender section for transmitting an application according to a request accepted by the application transmission request receiver section from the portable terminal device to the portable terminal device.

According to another embodiment, there is provided the server device with a configuration in which the application sender section acquires an application according to a request made by the portable terminal device from the application storage section and transmits the application to the portable terminal device.

According to the above configuration, the server device generates a transmitted message including parameter information and the identification information of an application to be executed in the portable terminal device on the basis of the parameter information and transmits the transmitted message to the portable terminal device, in case the application corresponding to the identification information does not exist in the portable terminal device. Thus, even if the application corresponding to the identification information does not exist in the portable terminal device, the portable terminal device is capable of obtaining the application smoothly from the server device without the need for the user to perform cumbersome operations including an inputting a URL or the like. In addition, since the user is capable of acquiring an application not existing in the portable terminal device from the server device by merely carrying out a simple operation, the service company providing the user with information is capable of providing information to the user with a higher degree of reliability.

According to another embodiment, there is provided the server device with a configuration in which the transmitted message generation section generates a transmitted message including pieces of identification information used for identifying a plurality of applications according to the specifications of the portable terminal device.

According to another embodiment, there is provided an application providing method implemented by using a portable terminal device having an IC chip capable of carrying out radio communications and a server device connected to the portable terminal device by using a communication network. The application providing method is characterized in that the application providing method includes the steps of: driving the IC chip to receive a transmitted message including parameter information and the identification information of an application to be executed by the portable terminal device on the basis of the parameter information from the server device; driving an application determination section of the portable terminal device determining as to whether or not the application corresponding to the identification information included in the transmitted message exists in the portable terminal device; driving the portable terminal device to generate a request for transmission of the application corresponding to the identification information from the server device to the portable terminal device and transmit the request to the server device in order to request the server device to transmit the application corresponding to the identification information to the portable terminal device in case the determination result indicates that the application corresponding to the identification information does not exist in the portable terminal device; and storing the application transmitted from the server device.

According to another embodiment, there is provided a computer program to be executed for driving a portable terminal device having an IC chip capable of carrying out radio communications and a server device connected to the portable terminal device by using a communication network. The computer program including the steps of: receiving a transmitted message including parameter information and the identification information of an application to be executed by the portable terminal device on the basis of the parameter information from the server device; determining as to whether or not the application corresponding to the identification information included in the transmitted message exists in the portable terminal device; generating a request for transmission of the application corresponding to the identification information from the server device to the portable terminal device and transmit the request to the server device in order to request the server device to transmit the application corresponding to the identification information to the portable terminal device in case the result of the determination indicates that the application corresponding to the identification information does not exist in the portable terminal device; and storing the application received from the server device.

According to another embodiment, there is provided a computer program to be executed for driving a portable terminal device having an IC chip capable of carrying out radio communications and a server device connected to the portable terminal device by using a communication network. The computer program including the steps of: generating a transmitted message including parameter information and the identification information of an application to be executed by the portable terminal device on the basis of the parameter information; transmitting the transmitted message to the portable terminal device in accordance with a request made by the portable terminal device; receiving a request transmitted by the portable terminal device as a request for transmission of the application to be executed by the portable terminal device on the basis of the parameter information from the server device to the portable terminal device in case the application to be executed by the portable terminal device on the basis of the parameter information does not exist in the portable terminal device; and transmitting the application according to the request made by the portable terminal device to the portable terminal device.

The above computer programs are each stored in a storage section employed in a computer to be read out by a CPU of the computer for execution. In this way, the computer is capable of executing functions of an information-processing device, which serves as the portable terminal device or server device described above. In addition, the user is also provided with a recording medium used for recording the computer programs, which can be read out by the computer to be executed thereby. Examples of the recording medium are a magnetic disk, an optical disk and the like.

As described above, according to an embodiment, there is provided an application providing system, a portable terminal device, a server device, an application providing method and computer programs determining the existence of a specified application program so as to allow the user to acquire desired information smoothly.

These and other features of the present disclosure will become clear from the following description of the embodiments given with reference to the accompanying diagrams.

Additional features and advantages are described herein, and will be apparent from, the following Detailed Description and the figures.

BRIEF DESCRIPTION OF THE FIGURES

FIG. 7 shows a timing chart of a flow of information exchanged between the portable terminal device and the server device, which are provided in accordance with an embodiment;

FIG. 8 shows a timing chart of a flow of information exchanged among the portable terminal device, the server device and the PC, which are provided in accordance with an embodiment; and FIG. 9 is an explanatory diagram showing typical screen displays each appearing on the display screen of the portable terminal device according to an embodiment.

DETAILED DESCRIPTION

Figure 1:
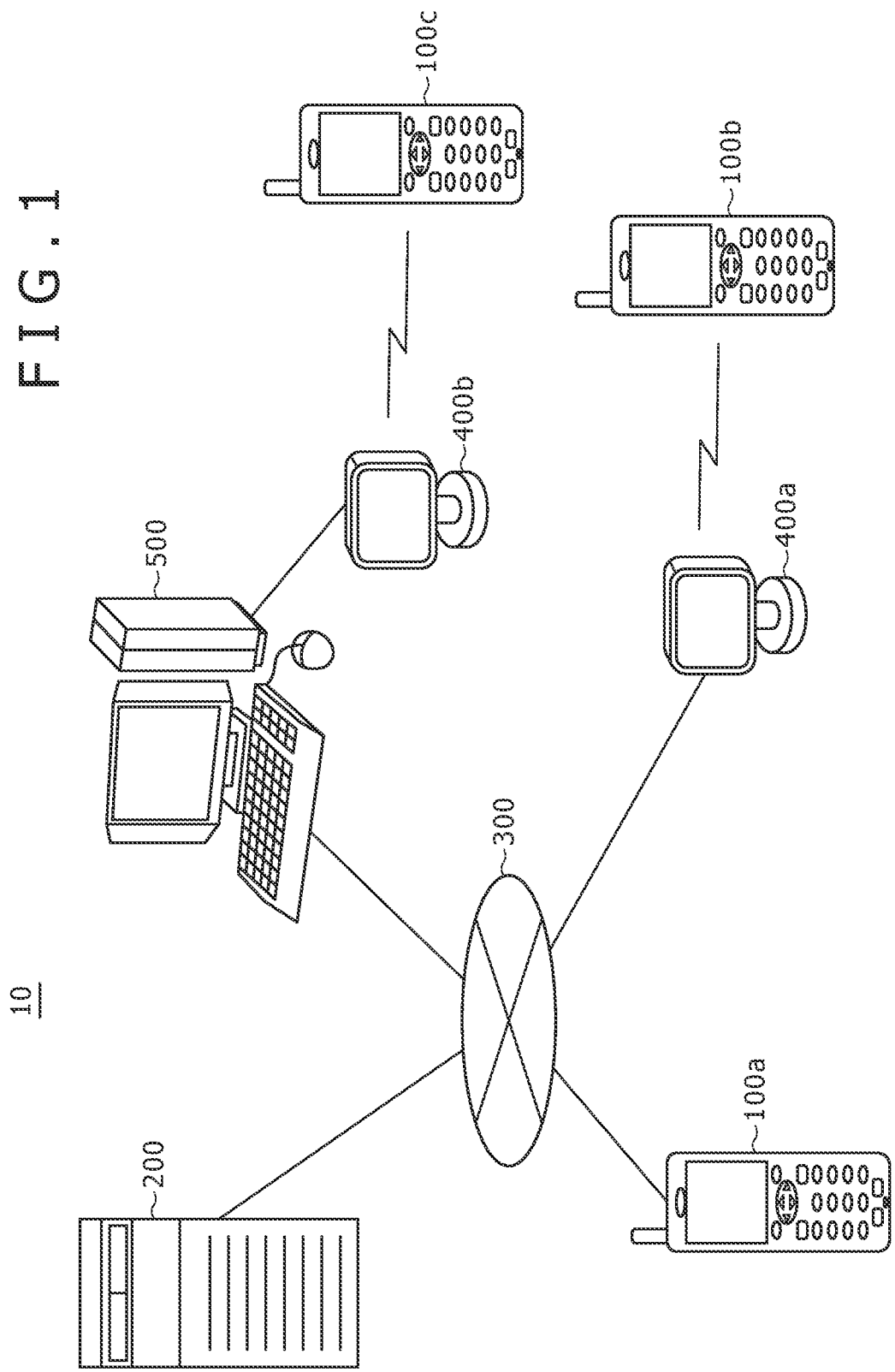
FIG. 1 is an explanatory diagram showing an information providing system according to an embodiment.

Embodiments of the present disclosure are described in detail with reference to the diagrams below. Configuration elements having substantially the same functional configurations are denoted by the same reference numeral throughout this patent specification and the diagrams in the specification to avoid duplicate description.

Referring to FIG. 1, the entire configuration of an information providing system 10 according to an embodiment is explained below. As shown in FIG. 1, the information providing system 10, for example, includes portable terminal devices 100a, 100b and 100c, a server device 200, a network 300, readers/writers 400a and 400b and a PC (personal computer) 500. In the following description, the portable terminal devices 100a, 100b and 100c are each denoted by generic reference numeral 100 if it is not necessary to distinguish the portable terminal devices 100a, 100b and 100c from each other. By the same token, the readers/writers 400a and 400b are each denoted by generic reference numeral 400 if it is not necessary to distinguish the readers/writers 400a and 400b from each other.

The server device 200 generates a transmitted message including parameter information and the identification information of an application to be executed by the portable terminal device 100 on the basis of the parameter information. Then, the server device 200 transmits the transmitted message to the portable terminal device 100 via the network 300. The parameter information is typically information used for requesting the application of the portable terminal device 100 to display information desired by the user or carry out predetermined processing. For example, the parameter information is information requesting the application of the portable terminal device 100 to display "Hello" on the display screen. The portable terminal device 100 executes the application corresponding to the identification information of the application included in transmitted message by using the parameter information as input data. For example, by using the parameter information requesting the application of the portable terminal device 100 to display "Hello" on the display screen as input data, the portable terminal device 100 executes the application corresponding to the identification information, displaying "Hello" on the display screen of the portable terminal device 100. As an alternative, the server device 200 holds an application to be provided to the portable terminal device 100 and, in accordance with a request made by the portable terminal device 100, the server device 200 transmits the application to the portable terminal device 100 via the network 300.

The information providing system 10 may include a plurality of server devices 200. There may be different kinds of server devices for different server device functions and different kinds of data held by the server device. For example, there may be an application server device used for storing applications and a download server device for downloading applications. Further, there may be a web server device for providing web pages. These server devices of different kinds may be connected to the network 300.

The portable terminal device 100 receives a transmitted message generated from the server device 200. The portable terminal device 100 then executes the application corresponding to the identification information of the application on the basis of the parameter information included in transmitted message. The portable terminal device 100 determines as to whether or not the application corresponding to the identification information of the application included in the transmitted message exists in the portable terminal device 100. If the result of the determination indicates that the application corresponding to the identification information does not exist in the portable terminal device 100, the portable terminal device 100 generates a request for transmission of the application corresponding to the identification information and transmits the request to the server device 200. In this case, the portable terminal device 100 receives the requested application from the server device 200 and the portable terminal device 100 being able to execute the application. Examples of the portable terminal device 100 are a portable phone, a PDA (personal digital assistant), a portable game device and a watch.

The server device 200 may transmit a transmitted message to a portable terminal device 100 via a reader/writer 400 or the PC 500. The PC 500 may pass on a transmitted message received from the server device 200 to the portable terminal device 100 via a reader/writer 400. The server device 200 may hold a web page displayable on the portable terminal device 100 or the PC 500 and transmit the web page including a transmitted message to the portable terminal device 100 or the PC 500 in accordance with a request made by the portable terminal device 100 or the PC 500 respectively. A web page can be held by the server device 200 or an device other than the server device 200.

The reader/writer 400 is one example of a radio communication device having a function to transmit a transmitted message to a non-contact-communication IC chip existing in a radio-communication range through a radio communication. It is to be noted that the reader/writer 400 may also be embedded in the PC 500 to form an integrated device or connected to the PC 500 as an independent device by using a cable. As another alternative, the reader/writer 400 may be connected to the server device 200 as an independent device through the network 300.

The PC 500 receives a transmitted message transmitted by the server device 200 via the network 300 and gives a command to the reader/writer 400 to send the transmitted message to the portable terminal device 100 by a radio communication. The PC 500 may also receive a web page including parameter information from the server device 200, generate a transmitted message on the basis of the parameter information included in the web page and send the transmitted message to the portable terminal device 100 via the reader/writer 400.

In a case where the reader/writer 400 sends a transmitted message to the portable terminal device 100, the portable terminal device 100 includes a non-contact-communication IC chip capable of carrying out radio communications so that the portable terminal device 100 is capable of performing radio communications with the reader/writer 400 in order to exchange messages. As described above, a transmitted message received by the IC chip of the non-contact-communication type includes the parameter information and the identification information of an application. The IC chip of the non-contact-communication type send the transmitted message to a controller employed in the portable terminal device 100 and, then, the controller executes the application corresponding to the identification information of the application on the basis of the parameter information.

For example, the reader/writer 400 also sends a communication controlling command for controlling the communication with the IC chip of the non-contact-communication type to the portable terminal device 100 along with the transmitted message so as to allow the communication between the IC chip of the non-contact-communication type and the controller of the portable terminal device 100 to be carried out smoothly. In other words, the reader/writer 400 sends the communication controlling command and the transmitted message to the non-contact-communication-type IC chip of the portable terminal device 100 by a radio communication. Receiving the communication controlling command, the IC chip of the non-contact-communication type switches the communication with the reader/writer 400 to a communication with the controller of the portable terminal device 100 and sends the transmitted message to the controller.

The IC chip of the non-contact-communication type can be employed in the portable terminal device 100 by being embedded in the portable terminal device 100 or by being placed on an IC card, which can be inserted into a card slot in the portable terminal device 100. In the latter case, the IC card inserted into a card slot in the portable terminal device 100 carries out radio communications with the reader/writer 400.

The network 300 is a communication-line network for connecting the server device 200 to the portable terminal device 100, the PC 500 or the reader/writer 400 in a state of being capable of carrying out duplex communications between the server device 200 and the portable terminal device 100, the PC 500 or the reader/writer 400. The network 300 can be a radio or wire network. Examples of the network 300 are a public-line network such as the Internet, a telephone-line network or a satellite communication network and a dedicated-line network such as a WAN, a LAN or an IP-VPN.

The entire configuration of the information providing system 10 has been explained so far. Next, the functional configurations of the portable terminal device 100 and server device 200 according to the embodiment are described by referring to FIG. 2 as follows.

Figure 2:
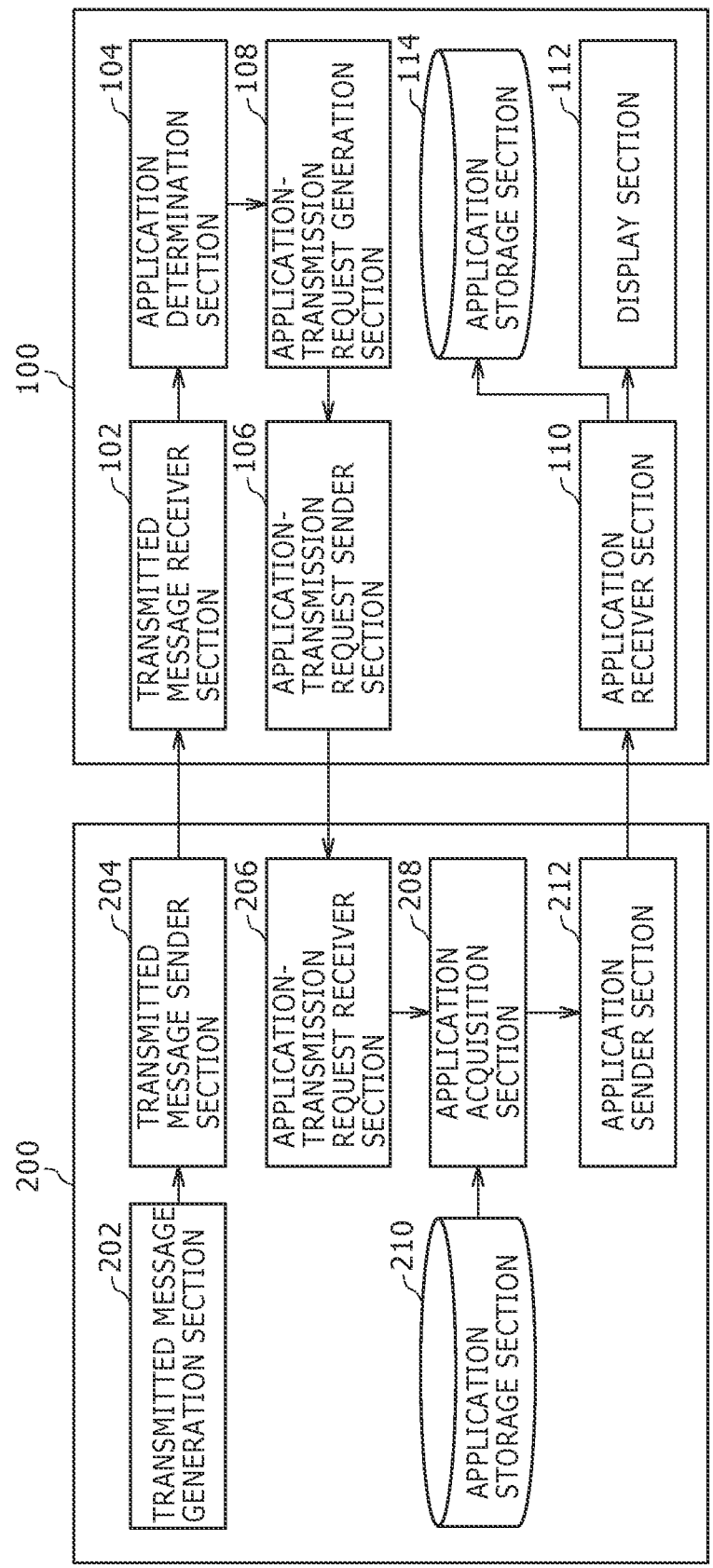
FIG. 2 is a block diagram showing functional configurations of a portable terminal device and a server device, which are provided in accordance with an embodiment.

FIG. 2 is a block diagram showing the functional configurations of the portable terminal device 100 and the server device 200. As shown in FIG. 2, the portable terminal device 100 includes a transmitted message receiver section 102, an application determination section 104, an application-transmission request sender section 106, an application-transmission request generation section 108, an application receiver section 110, a display section 112 and an application storage section 114.

The transmitted message receiver section 102 is a communication interface such as a communication line, a communication circuit, a communication device or the like. The transmitted message receiver section 102 has a function for receiving a transmitted message from the server device 200. A transmitted message received by the transmitted message receiver section 102 is passed on to the application determination section 104. As described above, a transmitted message received from the server device 200 includes parameter information and the identification information of an application to be executed by the portable terminal device 100 on the basis of the parameter information.

Figure 3:
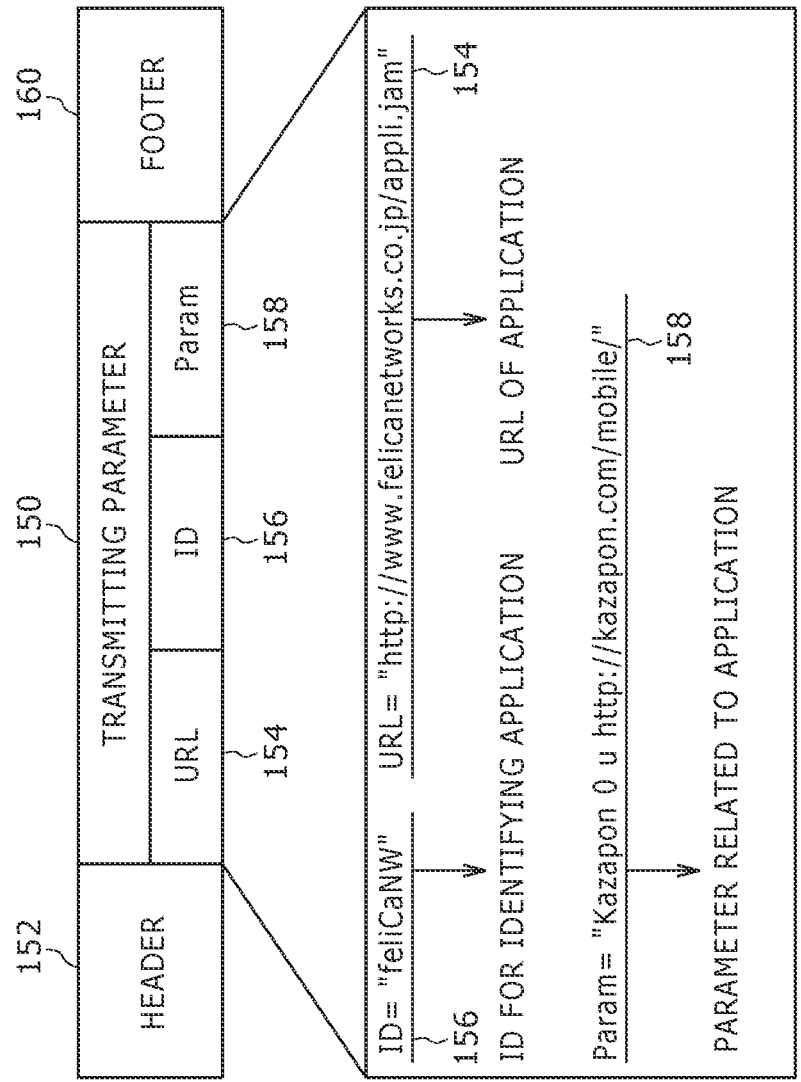
FIG. 3 is an explanatory diagram showing a typical transmitted message according to an embodiment.

Details of a transmitted message received from the server device 200 are described by referring to FIG. 3 as follows. FIG. 3 is an explanatory diagram showing one example of a transmitted message received from the server device 200. As shown in the figure, the transmitted message includes transmitting parameter 150, a header 152, and a footer 160. The transmitting parameter 150 includes a URL 154, an ID156, parameter information (Param) 158. The Param 158 is the parameter information explained earlier. The URL 154 and the ID 156 are identification information used for identifying an application to be executed on the basis of the Param 158. Applications of the portable terminal device 100 have been stored in the application storage section 114 in a state of being identifiable by using the ID 156 or the URL 154.

The information used for identifying an application may be dependent on the specifications of the portable terminal device 100. For example, in the portable terminal device 100 conforming to the specifications set by a mobile communication business company D, the application is identified by using the URL 154. In the portable terminal device 100 conforming to the specifications set by mobile communication business companies K and V, on the other hand, the application may be identified by using the ID 156. In this embodiment, both the URL 154 and the ID 156 are included in a transmitted message so that each of the portable terminal devices 100 manufactured by the mobile communication business companies D, K and V with specifications different from each other is capable of determining whether or not an application exists in the portable terminal device 100 as will be described later.

The application determination section 104 has a function to determine whether or not an application corresponding to the identification information of the application included in a transmitted message exists in the portable terminal device 100. For example, the application determination section 104 executes an application corresponding to identification information of the application included in a transmitted message and, if the application is not executed correctly, the application determination section 104 determines that the application does not exist in the portable terminal device 100. Here, correct execution of an application means that the application is executed on the basis of the parameter information to display desired information on the portable terminal device 100 successfully. If the application determination section 104 determines that an application does not exist in the portable terminal device 100, the application determination section 104 provides the result of the determination to the application-transmission request generation section 108. If the application determination section 104 determines that an application exists in the portable terminal device 100, on the other hand, the application is executed on the basis of the parameter information and a result of the application execution is displayed on the display section 112.

The application-transmission request generation section 108 has a function to generate a request for transmission of an application on the basis of a determination result received from the application determination section 104. To put it concretely, if the application determination section 104 determines that an application does not exist in the portable terminal device 100, the application-transmission request generation section 108 generates a transmitted message for requesting the server device 200 to send a corresponding application to the portable terminal device 100. The transmitted message, as the request for transmission of an application generated from the application-transmission request generation section 108, is provided to the application-transmission request sender section 106.

The application-transmission request sender section 106 is a communication interface such as a communication line, a communication circuit or a communication device. The application-transmission request sender section 106 sends a transmitted message provided by the application-transmission request generation section 108 to the server device 200.

The application receiver section 110 is a communication interface such as a communication line, a communication circuit or a communication device. The application receiver section 110 receives an application, corresponding to identification information of the application received by the transmitted message receiver section 102, from the server device 200. The application received by the application receiver section 110 is stored in the application storage section 114.

The display section 112 includes a display device and an interface for displaying data on the display device. The display device is typically a CRT display device or a liquid-crystal display device. The application receiver section 110 has a function to display a result of execution of an application received by the application receiver section 110 on a display screen of the portable terminal device 100.

The functional configuration of the portable terminal device 100 has been explained so far. Next, the functional configuration of the server device 200 is explained as follows. As shown in FIG. 2, the server device 200 includes a transmitted message generation section 202, and transmitted message sender section 204, an application-transmission request receiver section 206, an application acquisition section 208, an application storage section 210 and an application sender section 212.

The transmitted message generation section 202 has a function to generate a transmitted message including parameter information and the identification information of an application to be executed by the portable terminal device 100 on the basis of the parameter information. The transmitted message generation section 202 supplies the generated transmitted message to the transmitted message sender section 204.

The transmitted message sender section 204 is a communication interface such as a communication line, a communication circuit or a communication device. The transmitted message sender section 204 sends the transmitted message received from the transmitted message generation section 202 to the portable terminal device 100.

The application-transmission request receiver section 206 has a function to receive a request from the portable terminal device 100 as a request for transmission of an application corresponding to the identification information cited above from the server device 200 to the portable terminal device 100 in case the application does not exist in the portable terminal device 100. The application acquisition section 208 is a section for acquiring the application requested by the portable terminal device 100 from the application storage section 210. The application acquisition section 208 supplies the acquired application to the application sender section 212.

The application storage section 210 is a memory used for storing a plurality of applications. A hard-disk drive is a typical application storage section 210. The application storage section 210 can also be provided in a server device other than the server device 200.

The application sender section 212 is a communication interface such as a communication line, a communication circuit or a communication device. The application sender section 212 has a function to send an application supplied by the application acquisition section 208 to the portable terminal device 100.

The functional configurations of the portable terminal device 100 and the server device 200 have been explained so far. As described above, the portable terminal device 100 may acquire a transmitted message sent from the server device 200 to the portable terminal device 100 via the reader/writer 400 or the PC 500. In this case, the portable terminal device 100 is provided with a non-contact-communication IC chip for carrying out radio communications between the portable terminal device 100 and the reader/writer 400. That is to say, the IC chip of the non-contact-communication type acquires a transmitted message transmitted to the portable terminal device 100.

Next, a typical configuration of the PC 500 is explained by referring to FIG. 4 as follows. In the typical configuration shown in the figure, the PC 500 includes a reader/writer 400. However, the PC 500 is not limited to this configuration. That is to say, a reader/writer 400 separated from the PC 500 may be connected to the PC 500 as an independent device by using a cable.

Figure 4:
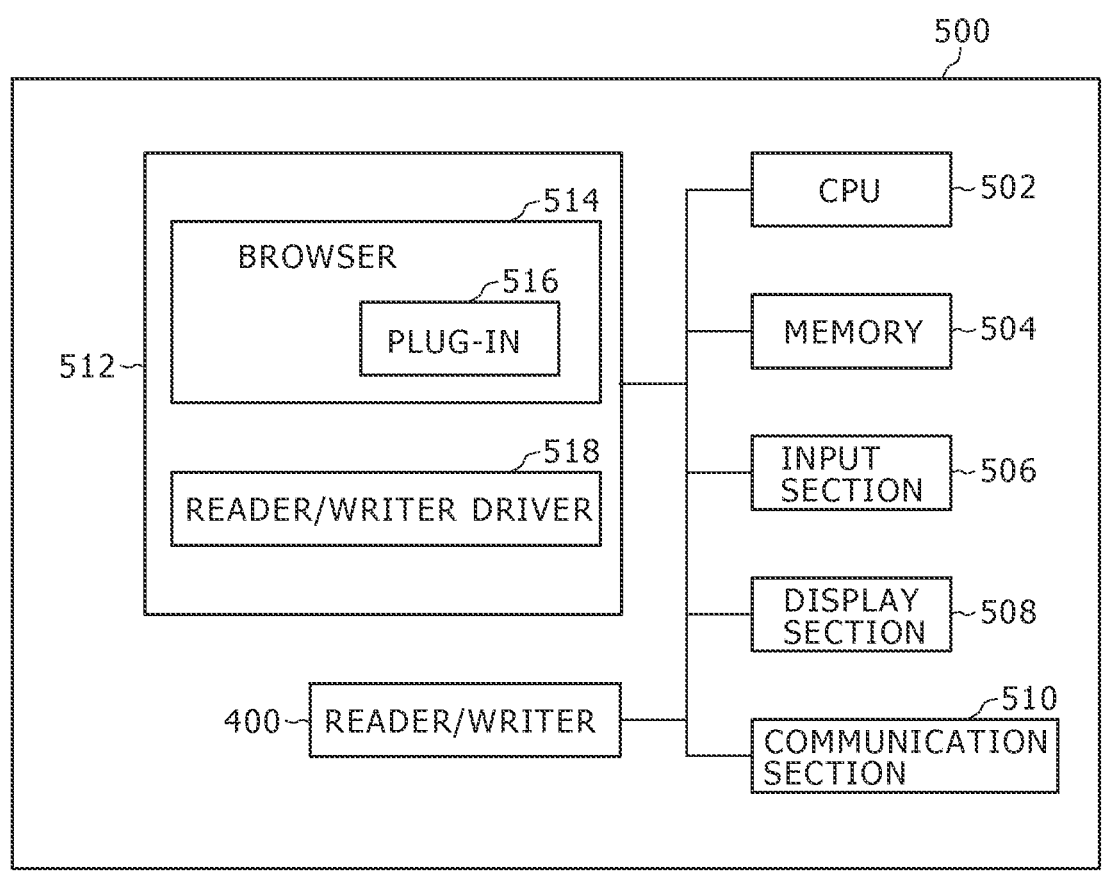
FIG. 4 is a block diagram showing the configuration of a PC according to an embodiment.

As shown in FIG. 4, the PC 500 includes a CPU 502, a memory 504, an input section 506, a display section 508, a communication section 510, a hard disk 512 and a reader/writer 400. The CPU 502 functions as an arithmetic processing and control device for controlling processing carried out by other components composing the PC 500. The memory 504 is typically a ROM and a RAM. The memory 504 has a function of a storage section used for temporarily storing information such as various kinds of data related to processing carried out by the CPU 502 and operating programs executed by the CPU 502.

The input section 506 has an input device and an interface section for receiving data inputted from the input device. The input device may include a keyboard and a mouse.

The display section 508 includes a display device and an interface section for displaying data on the display device in accordance with an instruction issued by the CPU 502. The display device can be a CRT display device, a liquid-crystal display device or the like.

The communication section 510 is a communication interface such as a communication line, a communication circuit or a communication device. The communication section 510 is capable of exchanging transmitted messages with external device such as the server device 200 through the network 300.

The hard disk 512 is a typical storage device, such as a flash memory, used for storing various kinds of data such as the operating system (OS) and a variety of application programs. The hard disk 512 is one example of a storage section including a browser 514 and a reader/writer driver 518. It is to be noted that the browser 514 and the reader/writer driver 518 do not have to be stored in a hard disk but can be stored in the memory 504.

The reader/writer 400 is a section for carrying out radio communications with the non-contact-communication IC chip employed in the portable terminal device 100. The reader/writer 400 and the non-contact-communication IC chip are capable of carrying out radio communications with each other in a non-contact way within a near field of about 10 cm in accordance with the NFC (Near Field Communication) standards having an RF carrier frequency of 13.56 MHz and communication speeds of up to 212 Kbps.

The reader/writer driver 518 stored in the hard disk 512 is a device driver for the CPU 502 to control the reader/writer 400.

Figure 5:
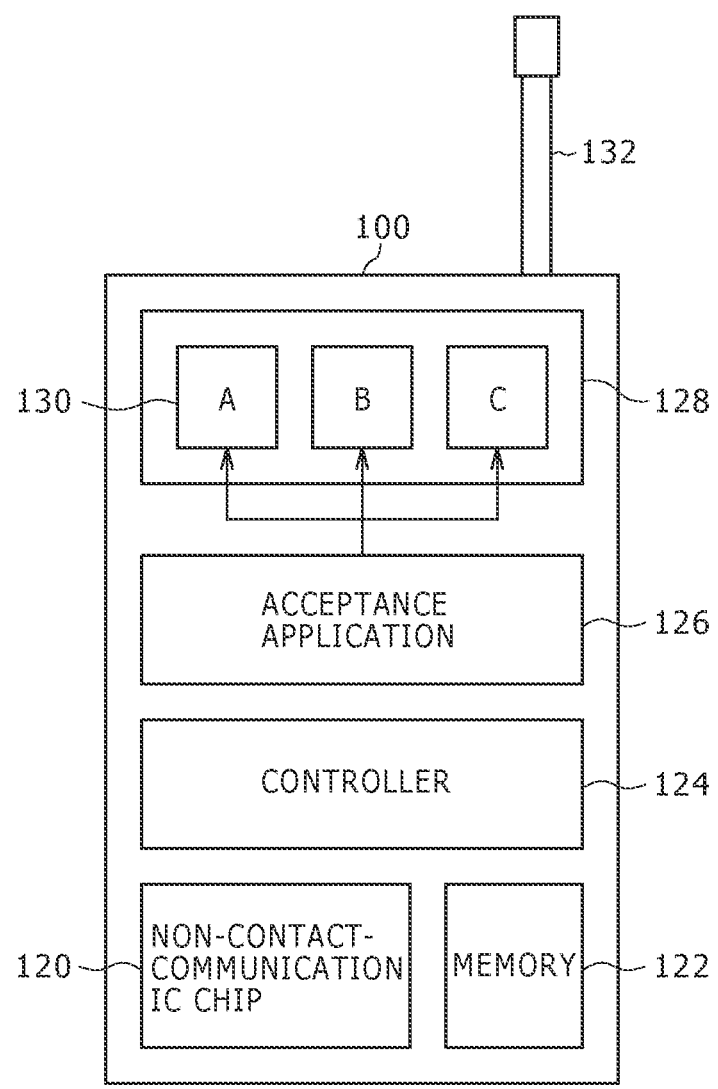
FIG. 5 is a block diagram showing the configuration of a portable terminal device employing a non-contact-communication IC chip according to an embodiment.

The configuration of the PC 500 has been described so far. Next, the configuration of the portable terminal device 100 employing the IC chip of the non-contact-communication type is explained by referring to FIG. 5 as follows. As shown in FIG. 5, the portable terminal device 100 includes a non-contact-communication IC chip 120, a memory 122, a controller 124, an acceptance application 126, applications 128 and an antenna 132.

The non-contact-communication IC chip 120 receives AC power from the antenna 132 employed by the portable terminal device 100. To put it in detail, when a communication between the non-contact-communication IC chip 120 and the reader/writer 400 is being carried out in a non-contact way, the antenna 132 generates an induction voltage on the basis of a magnetic field generated by the reader/writer 400 as a voltage used for driving the non-contact-communication IC chip 120. The non-contact-communication IC chip 120 operated in this way is then capable of exchanging data with the reader/writer 400 by a radio communication through the antenna 132.

The non-contact-communication IC chip 120 is configured to include typically a rectification circuit, a power generation section, a demodulator, a modulator, a receiver, a sender, a CPU (Central Processing Unit), a ROM (Read Only Memory), a RAM (Random Access Memory), an EEPROM (Electrically Erasable Programmable Read Only memory), an encryption engine, an RNG (Random Number Generator) and a CRC (Cyclic Redundancy Check) circuit. In the case of a portable terminal device 100 employing a non-contact-communication IC chip 120, the transmitted message receiver section 102 included in the non-contact-communication IC chip 120 receives transmitted messages transmitted by the server device 200 via the reader/writer 400. The application-transmission request sender section 106 and the application receiver section 110, which are also employed in the portable terminal device 100, are connected to the server device 200 to transmit a request to the server device 200 as a request for transmission of an application from the server device 200 to the portable terminal device 100, and receive the requested application from the server device 200.

The rectification circuit is a circuit for rectifying an AC voltage received from the antenna 132 and supplying a DC voltage obtained as a result of the rectification to the power generation section. The power generation section is a section for generating a power-supply voltage to be used in the non-contact-communication IC chip 120 from the received DC voltage. The demodulator is a component for demodulating a signal received through the antenna 132 into an electrical signal that can be processed in the non-contact-communication IC chip 120 and supplying the electrical signal to the receiver. The modulator is a component for modulating an electrical signal to be transmitted from the non-contact-communication IC chip 120 to the reader/writer 400 via the antenna 132 into a signal that can be transmitted in a non-contact communication.

The CPU is an arithmetic processing device driven to operate by a power-supply voltage generated by the power generation section in the non-contact-communication IC chip 120. The CPU controls all the other components employed in the non-contact-communication IC chip 120. The ROM is a nonvolatile memory used for storing a variety of application programs and an operating system serving as a platform. In the following description, the operating system is abbreviated as OS.

On the other hand, the RAM is a volatile memory used for temporarily storing a variety of application programs and the OS. The EEPROM is a memory used for storing mainly user data. However, the EEPROM can also be used for storing software such as an application program or the OS. In addition, a flash memory can also be used in place of the EEPROM. The encryption engine is a device for carrying out encryption and compounding processes on exchanged data with external device. The RNG is a device for generating a random number to be used as an encryption key in an encryption process. The CRC circuit is a circuit for examining the cyclic redundancy of data received from an external device. That is to say, the CRC checks errors of the data.

A transmitted message received by the non-contact-communication IC chip 120 from the reader/writer 400 is stored in the RAM employed in the non-contact-communication IC chip 120. When a transmitted message received by the non-contact-communication IC chip 120 from the reader/writer 400 is stored in the RAM employed in the non-contact-communication IC chip 120 and a communication is ended, the non-contact-communication IC chip 120 informs the controller 124 that the communication has been ended.

In addition, as described above, the reader/writer 400 may transmit a command besides a transmitted message to the non-contact-communication IC chip 120. Normally, the transmitted command is a command for controlling the communication of the non-contact-communication IC chip 120. In this case, the portable terminal device 100 may include a first communication section and a second communication section. The first communication section is a section for carrying out communications of the non-contact-communication type within short distances between the reader/writer 400 and the non-contact-communication IC chip 120. On the other hand, the second communication section is a section for carrying out communications between the controller 124 and the non-contact-communication IC chip 120. Receiving a command for controlling the communication with transmitted message transmitted by the reader/writer 400 through the first communication section, the non-contact-communication IC chip 120 switches the communication between the reader/writer 400 and the non-contact-communication IC chip 120 to a communication between the controller 124 and the non-contact-communication IC chip 120, supplying the transmitted message to the controller 124 via the second communication section. By switching the communication of the non-contact-communication type within short distances between the reader/writer 400 and the non-contact-communication IC chip 120 to a communication between the controller 124 and the non-contact-communication IC chip 120 in accordance with a command for controlling the communication of the non-contact-communication IC chip 120 in this way, the portable terminal device 100 is capable of executing an application stored in the portable terminal device 100 on the basis of parameter information included in the transmitted message transmitted from the reader/writer 400.

The memory 122 includes a ROM and a RAM. The memory 122 has a function of a memory used for temporarily storing information such as various kinds of data related to controlling processing carried out by the controller 124 and operating programs of the controller 124.

The controller 124 is a section for receiving a transmitted message transmitted by the non-contact-communication IC chip 120 via the second communication section, executing an application corresponding to identification information included in the transmitted message and displaying a result of the execution on a display screen of the portable terminal device 100. More specifically, when the controller 124 receives a transmitted message from the non-contact-communication IC chip 120, the controller 124 passes on the transmitted message received from the non-contact-communication IC chip 120 to the acceptance application 126. The acceptance application 126 then provides parameter information to the application corresponding to the identification information of the application included in the transmitted message. The identification information, such as ID 156 or URL 154, is used by the acceptance application 126 to determine as to whether or not the application corresponding to the identification information has been stored in the application storage section 114.

For example, an application A130 is stored in the application storage section 114 in a state of being identifiable by an ID 156 of "feliCaNW". The acceptance application 126 searches the application storage section 114 for an application corresponding to the identification information "ID=feliCaNW" of application included in the transmitted message. Since the application A130 has been stored in the application storage section 114, the acceptance application 126 detects the application A130 in the search operation and assigns the parameter information to the application A130. The application A130 is executed on the basis of the parameter information.

As another example, let us assume that an application A130 has been stored in the application storage section 114 in a state of being identifiable by a URL 154 of "http://www.felicanetworks.co.jp/appli.jam". Also the identification information extracted by the acceptance application 126 from the transmitted message is a URL 154 of "http://www.felicanetworks.co.jp/appli.jam". In this case, the acceptance application 126 searches the application storage section 114 for an application corresponding to the identification information "http://www.felicanetworks.co.jp/appli.jam" of the application included in the transmitted message. Then the acceptance application 126 provides the parameter information to the application A130 which identification information is "URL=http://www.felicanetworks.co.jp/appli.jam". As described above, the parameter information will be used by the controller 124 as a basis of execution of the application A130.

Figure 6:
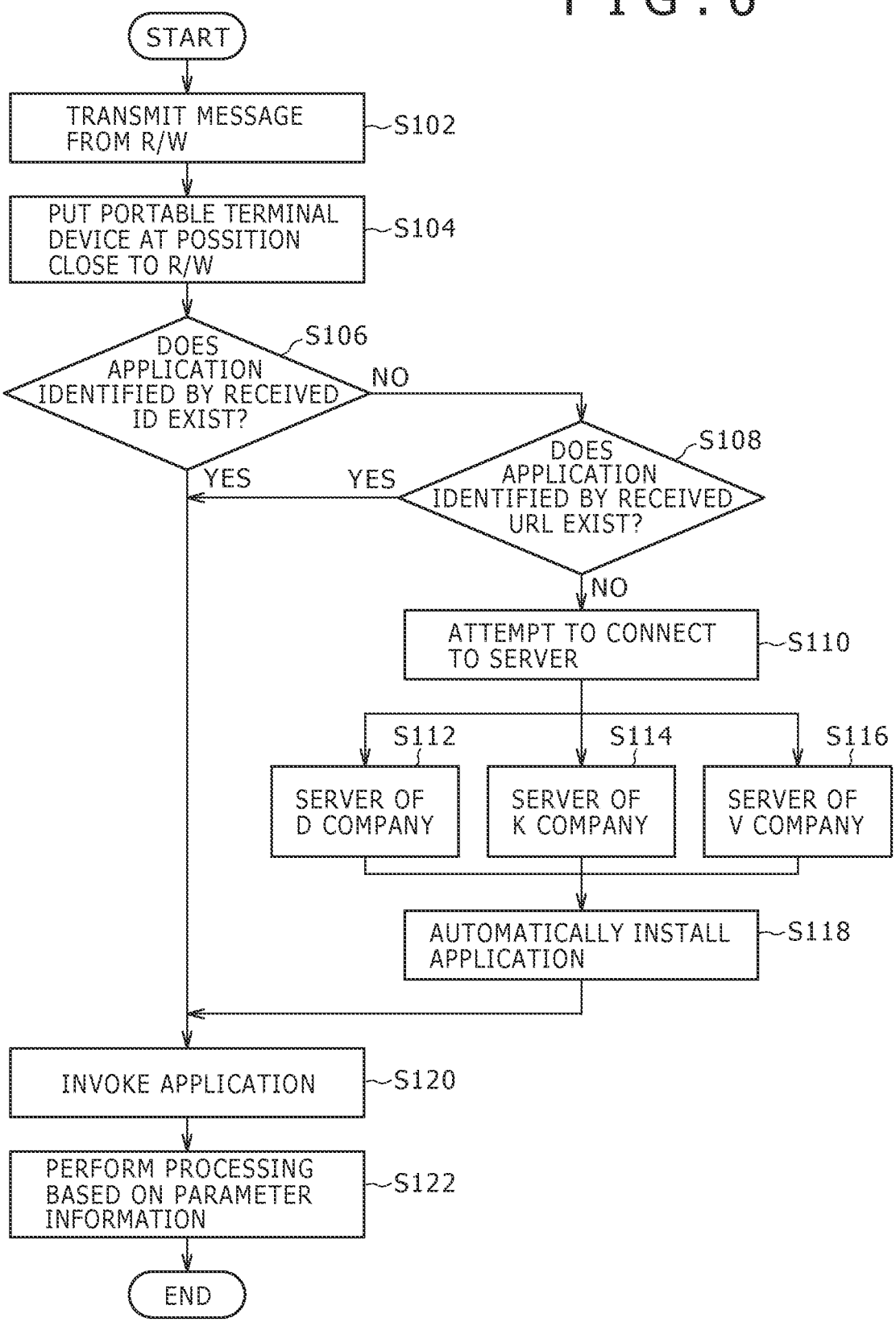
FIG. 6 shows a flowchart referred to in explanation of the flow of processing carried out by the information providing system according to an embodiment.

The functional configuration of the portable terminal device 100 employing an IC chip of the non-contact-communication type has been explained so far. Next, by referring to a flowchart shown in FIG. 6, the following description explains the flow of a processing procedure executed by the application providing system 10 according to the embodiment. It is to be noted that typical screen displays shown in FIG. 9 are also referred to in the explanation of the processing procedure. In the processing procedure represented by the flowchart shown in FIG. 6, a transmitted message is transmitted from the reader/writer 400 to the portable terminal device 100. However, the processing procedure is no more than a typical procedure, which does not limit the source of the transmitted message transmission. For example, the transmitted message can also be transmitted from the server device 200 to the portable terminal device 100 or from the PC 500 to the portable terminal device 100.

To begin with, at the step S102 of the flowchart, the reader/writer 400 transmits a transmitted message. As described above, the reader/writer (R/W) 400 and the non-contact-communication IC chip employed in the portable terminal device 100 are capable of carrying out radio communications with each other in a non-contact way within a near field of about 10 cm. The user holds the portable terminal device 100 at such a location close enough to the reader/writer 400 then the transmitted message can be transmitted to the portable terminal device 100 in a non-contact communication at the next step S104.

Then, at the next step S106, the portable terminal device 100 determines as to whether or not the application corresponding to an application ID included in the transmitted message received in the process of the step S104 as information used for identifying an application exists in the portable terminal device 100. If the determination result at the step S106 indicates that the application corresponding to an application ID included in the transmitted message exists in the portable terminal device 100, the flow of the processing procedure goes on to a step S120. If the determination result at the step S106 indicates that the application corresponding to an application ID included in the transmitted message does not exist in the portable terminal device 100, on the other hand, the flow of the processing procedure goes on to a step S108 at which the portable terminal device 100 determines as to whether or not the application corresponding to a URL included in the transmitted message received in the process of the step S104 as information used for identifying an application exists in the portable terminal device 100.

If the determination result at the step S108 indicates that the application corresponding to a URL included in the transmitted message exists in the portable terminal device 100, the flow of the processing procedure goes on to the step S120. If the determination result at the step S108 indicates that the application corresponding to a URL included in the transmitted message does not exist in the portable terminal device 100, on the other hand, the flow of the processing procedure goes on to a step S110 at which the portable terminal device 100 connects itself to the server device 200. The server device 200 may be perceived as information-providing server device run by a plurality of mobile communication business companies. Thus, the portable terminal device 100 is connected to an information-providing server device that conforms to the specifications of the portable terminal device 100. Let us assume for example that the portable terminal device 100 is connected to an information-providing server device D at a step S112 if the portable terminal device 100 conforms to the specifications of the D mobile communication business company. The portable terminal device 100 is connected to an information-providing server device K at a step S114 if the portable terminal device 100 conforms to the specifications of the K mobile communication business company. The portable terminal device 100 is connected to an information-providing server device V at a step S116 if the portable terminal device 100 conforms to the specifications of the V mobile communication business company. Then, at the next step S118, the portable terminal device 100 automatically installs an application corresponding to application identification information included in the transmitted message, which was originated from the information-providing server device connected to the portable terminal device 100. A process to automatically install an application from the server device 200 is explained as follows. At the beginning of a process to install the application at the step S118, a typical screen display 602 shown in FIG. 9 appears on the screen of the portable terminal device 100. At that time, with the typical screen display 602 appearing on the screen, if the user enters an input indicating acceptance of the application to be installed, a typical screen display 604 appears on the screen to indicate that data representing the application downloaded by the server device 200 is being received by the portable terminal device 100.

After the process to automatically install the application downloaded from the server device 200 in the portable terminal device 100 at the step S118 has been completed, the flow of the processing procedure goes on to the step S120 at which the installed application is invoked. As described above, if the determination result the step S106 or S108 indicates that the application corresponding to an application ID included in the transmitted message exists in the portable terminal device 100, the flow of the processing procedure goes on directly to the step S120 at which the application already existing in the portable terminal device 100 is invoked. At the beginning of a process to invoke the application, a typical screen display 606 shown in FIG. 9 appears on the screen of the portable terminal device 100. At that time, with the typical screen display 606 appearing on the screen, if the user enters an input indicating acceptance of the application to be invoked, a typical screen display 608 appears on the screen to indicate that the application has been invoked.

After the application has been invoked in the process carried out at the step S120, the flow of the processing procedure goes on to step S122 at which the application is executed on the basis of the parameter information included in the transmitted message. For example, if the parameter information included in the transmitted message requests the application to display "Hello!" on the display screen, the application executed on the basis of the parameter information displays the typical screen display 608 shown in FIG. 9. That is to say, the application displays "Hello!" on the display screen of the portable terminal device 100.

The flow of the procedure of processing carried out by the information providing system 10 has been described so far. By referring to a flowchart shown in FIG. 7, the following description explains a flow of information exchanged between the portable terminal device 100 and the server device 200.

The flow of information begins with a step S202 at which the portable terminal device 100 transmits a request for a transmitted message to the server device 200. Then, at the next step S204, the server device 200 generates the transmitted message requested by the portable terminal device 100. Subsequently, at the next step S206, the server device 200 transmits the generated message to the portable terminal device 100. The server device 200 may transmit a transmitted message to the portable terminal device 100 even if not requested by the portable terminal device 100.

At the step S206, the portable terminal device 100 receives the transmitted message including parameter information and identification information of the application from the server device 200. Then, at the next step S208, the portable terminal device 100 determines as to whether or not an application corresponding to the identification information included in the transmitted message exists in the portable terminal device 100. If the determination result at the step S208 indicates that the application corresponding to the identification information included in the transmitted message does not exist in the portable terminal device 100, at the next step S210, the portable terminal device 100 generates a request for transmission of the application from the server device 200 to the portable terminal device 100. Then, at the next step S212, the portable terminal device 100 transmits the request generated in the process carried out at the step S210 to the server device 200.

At the step S212, the server device 200 receives the request for transmission of the application from the server device 200 to the portable terminal device 100. Then, at the next step S214, the server device 200 retrieves the application from an application storage section employed in the server device 200 or from another server device holding the application. Subsequently, at the next step S216, the server device 200 sends the application acquired in the process carried out at the step S214 to the portable terminal device 100.

At the step S216, the portable terminal device 100 receives the application from the server device 200. Then, at the next step S218, the portable terminal device 100 stores the received application in a memory. Subsequently, at the next step S220, the portable terminal device 100 invokes the application stored in the process carried out at the step S218 and executes the application on the basis of the parameter information included in the transmitted message. Then, at the next step S222, the portable terminal device 100 displays a result of executing the application on the basis of the parameter information in the process carried out at the step S220 on the display screen of the portable terminal device 100.

The above description has explained the flow of information exchanged between the portable terminal device 100 and the server device 200. By referring to a flowchart shown in FIG. 8, the following description explains flows of information exchanged among the portable terminal device 100, the server device 200 and the PC 500 for a configuration in which the PC 500 employs a reader/writer 400 and the portable terminal device 100 employs an IC chip of the non-contact-communication type.

The flowchart begins with a first step S252 at which the PC 500 transmits a request for a transmitted message to the server device 200. Then, at the next step S254, the server device 200 transmits the requested transmitted message to the PC 500. At the step S254, the PC 500 receives the requested transmitted message from the server device 200. Subsequently, at the next step S256, on the basis of the received transmitted message, the PC 500 generates a transmitted message transmissible from the reader/writer 400 employed in the PC 500 to the non-contact-communication IC chip employed in the portable terminal device 100. For example, the PC 500 may embed the transmitted message into data having a predetermined format to generate data of the aforementioned transmitted message exchangeable between the reader/writer 400 employed in the PC 500 to the non-contact-communication IC chip employed in the portable terminal device 100 by radio communication. After generating a transmitted message transmissible from the reader/writer 400 employed in the PC 500 to the non-contact-communication IC chip employed in the portable terminal device 100 in the process carried out at the step S256, at the next step S258, the PC 500 transmits the transmitted message to the non-contact-communication IC chip employed in the portable terminal device 100.

At the step S258, the portable terminal device 100 receives the transmitted message, which includes parameter information and identification information of the application, from the PC 500. Then, at the next step S260, the portable terminal device 100 determines as to whether or not an application corresponding to the identification information of the application included in the transmitted message exists in the portable terminal device 100. If the determination result produced at the step S260 indicates that the application corresponding to the identification information included in the transmitted message does not exist in the portable terminal device 100, at the next step S262, the portable terminal device 100 generates a request for transmission of the application from the server device 200 to the portable terminal device 100. Then, at the next step S264, the portable terminal device 100 transmits the request generated in the process carried out at the step S262 to the server device 200.

At the step S264, the server device 200 receives the request for transmission of the application from the server device 200 to the portable terminal device 100. Then, at the next step S266, the server device 200 retrieves the corresponding application from an application storage section employed in the server device 200 or from another server device holding the application. Subsequently, at the next step S268, the server device 200 sends the application acquired in the process carried out at the step S266 to the portable terminal device 100.

At the step S268, the portable terminal device 100 receives the application from the server device 200. Then, at the next step S270, the portable terminal device 100 stores the received application in a memory. Subsequently, at the next step S272, the portable terminal device 100 invokes the application stored in the process carried out at the step S270 and executes the application on the basis of the parameter information included in the transmitted message. Then, at the next step S274, the portable terminal device 100 displays a result of executing the application on the basis of the parameter information in the process of the step S272 on the display screen of the portable terminal device 100.

The above description has explained the flows of information exchanged among the portable terminal device 100, the server device 200 and the PC 500. In accordance with the application providing system implemented by the embodiment, the portable terminal device determines as to whether or not an application corresponding to identification information of the application included in a transmitted message exists in the portable terminal device, making it possible to smoothly provide the user of the portable terminal device with information desired by the user. Thus, even if the result of the determination indicates that the application corresponding to the identification information included in the transmitted message does not exist in the portable terminal device, the portable terminal device is capable of smoothly acquiring the application from the server device, making it possible to smoothly provide the user of the portable terminal device with information desired by the user without requiring the user to carry out a cumbersome operation such as an operation to input a URL associated with the application. Since an application not existing in the portable terminal device can be obtained from the server device by merely carrying out a simple operation, a service company providing the user with information is capable of providing information to the user with a higher degree of reliability.

The embodiments of the present invention have been described above by referring to diagrams. It is needless to say, however, that the scope of the present invention is by no means limited by the described embodiments. It is obvious that a person skilled in the art is capable of coming up with a variety of changes and modifications within domains described in the scope of claims appended to this specification. Such changes and modifications are of course to be interpreted as changes and modifications falling within the technological range of the present invention. That is to say, it should be understood by those skilled in the art that a variety of modifications, combinations, sub-combinations and alterations may occur in dependence on design and other factors insofar as they are within the scope of the appended claims or the equivalents thereof.

In accordance with the embodiments, desired information is displayed on the display screen as a result of executing an application corresponding to identification information included in a transmitted message. However, the scope of the present invention is by no means limited by the described embodiments. For example, update data included in parameter information also included in the transmitted message is used as an update in a rewrite operation. Thus, even if the application for using update data in a rewrite operation does not exist in the portable terminal device, a rewrite operation using the update data can be performed by carrying out a simple operation.

While embodiments of the present invention have been described using specific terms, such description is for illustrative purposes only, and it is to be understood that changes and variations may be made without departing from the spirit or scope of the following claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A portable terminal device capable of connecting to a server device through a communication network, the portable terminal device comprising:
    a transmitted message receiver section configured to receive a URL and identification information for identifying an application and parameter information relating to the application to be executed, wherein the parameter information includes a request to the application to display a desired information;
    an application determination section configured to determine whether the application corresponding to the identification information exists in the portable terminal device by receiving the URL and the identification information from an IC chip in the portable terminal device and passing on the identification information to an acceptance application, which determines using both of the identification information and the URL whether or not the application exists in the portable terminal device;
    an application transmission request generation section configured to generate, based on the application detection section using both the identification information and the URL, a request for transmission of the application from the server device to the portable terminal device if the application determination section determines that the application does not exist in the portable terminal device;

an application storage section configured to store the application transmitted by the server device; and an execution section configured to execute the application corresponding to the identification information using the parameter information to cause display of the desired information.

2. The portable terminal device of claim 1, further comprising a display section.

3. The portable terminal device of claim 2, wherein the display section is configured to display a result of execution of the application corresponding to the identification information.

4. The portable terminal device of claim 2, wherein the display section is configured to display an indication that the application is being received by the portable terminal device.

5. The portable terminal device of claim 4, wherein the application is executed according to an input by a user for executing the application.

6. The portable terminal device of claim 1, wherein the desired information includes a predetermined word.

7. The portable terminal device of claim 1, wherein depending on a manufacturer of the portable terminal device, only one of the URL or the identification information identifies whether the application exists in the portable terminal device.

8. The portable terminal device of claim 7, wherein if the portable terminal device is manufactured by a first manufacturer, the portable terminal device conforms to specifications of the first manufacturer and the identification information identifies whether the application exists in the portable terminal device.

9. The portable terminal device of claim 7, wherein if the portable terminal device is manufactured by a second manufacturer, the portable terminal device conforms to specifications of the second manufacturer and the URL identifies whether the application exists in the portable terminal device.

10. An application providing method comprising:
receiving a URL and identification information for identifying an application and parameter information relating to the application to be executed, wherein the parameter information includes a request to the application to display a desired information;
determining whether the application corresponding to the identification information exists in a portable terminal device by receiving the URL and the identification information from an IC chip in the portable terminal device and passing on the identification information to an acceptance application, which determines using both of the identification information and the URL whether or not the application exists in the portable terminal device;
generating, based on using both the identification information and the URL, a request for transmission of the application from a server device to the portable terminal device upon determining that the application does not exist in the portable terminal device;
storing, in the portable terminal device, the application transmitted by the server device; and
executing, in the portable terminal device, the application corresponding to the identification information using the parameter information to cause display of the desired information.

11. The method of claim 10, wherein the portable terminal device includes a display section.

12. The method of claim 11, further comprising displaying, on the display section, a result of execution of the application corresponding to the identification information included in the message.

13. The method of claim 11, further comprising displaying, on the display section, an indication that the application is being received by the portable terminal device.

14. The method of claim 13, further comprising executing the application according to an input by a user for executing the application.

15. A non-transitory computer readable medium storing instructions, which when executed by a portable terminal device, causes the portable terminal device to:
receive a URL and identification information for identifying an application and parameter information relating to the application to be executed, wherein the parameter information includes a request to the application to display a desired information;
determine whether the application corresponding to the identification information exists in the portable terminal device by receiving the URL and the identification information from an IC chip in the portable terminal device and passing on the identification information to an acceptance application, which determines using both of the identification information and the URL whether or not the application exists in the portable terminal device;
generate, based on using both the identification information and the URL, a request for transmission of the application from a server device to the portable terminal device upon determining that the application does not exist in the portable terminal device;
store, in the portable terminal device, the application transmitted by the server device; and
execute, in the portable terminal device, the application corresponding to the identification information using the parameter information to cause display of the desired information.

16. The non-transitory computer readable medium of claim 15, wherein the portable terminal device includes a display section.

17. The non-transitory computer readable medium of claim 16, which further causes the portable terminal device to display, on the display section, a result of execution of the application corresponding to the identification information included in the message.

18. The non-transitory computer readable medium of claim 16, which further causes the portable terminal device to display, on the display section, an indication that the application is being received by the portable terminal device.

19. The non-transitory computer readable medium of claim 18, which further causes the portable terminal device to execute the application according to an input by a user for executing the application.

* * * * *